United States Patent [19]
Jergens et al.

[11] Patent Number: 5,934,744
[45] Date of Patent: Aug. 10, 1999

[54] CROSS CAR STRUCTURAL BEAM

[75] Inventors: James Martin Jergens, Englewood; Stephen Moore Pitrof, Bellbrook, both of Ohio

[73] Assignee: General Motors Corporation, Detroit, Mich.

[21] Appl. No.: 08/942,434

[22] Filed: Oct. 1, 1997

[51] Int. Cl.⁶ ............................................. B60J 7/00
[52] U.S. Cl. ................... 296/192; 296/194; 296/203.02; 296/70; 296/72; 296/208; 454/121
[58] Field of Search ..................... 296/192, 194, 296/70, 72, 203.02, 208; 454/121

[56] References Cited

U.S. PATENT DOCUMENTS

| | | |
|---|---|---|
| 2,141,635 | 12/1938 | Almdale . |
| 2,901,266 | 8/1959 | Lindsay . |
| 3,724,153 | 4/1973 | Wessells, III et al. . |
| 3,724,357 | 4/1973 | Kavthekar et al. . |
| 4,391,465 | 7/1983 | Piano . |
| 4,413,840 | 11/1983 | Shah . |
| 4,552,400 | 11/1985 | Harasaki et al. . |
| 4,559,868 | 12/1985 | Nonaka et al. . |
| 4,582,357 | 4/1986 | Nakamura et al. . |
| 4,646,879 | 3/1987 | Mahler et al. . |
| 4,826,238 | 5/1989 | Misono et al. . |
| 4,898,764 | 2/1990 | Kurihara et al. . |
| 5,005,898 | 4/1991 | Benedetto et al. . |
| 5,042,872 | 8/1991 | Yoshii . |
| 5,082,078 | 1/1992 | Umeda et al. . |
| 5,088,571 | 2/1992 | Burry et al. . |
| 5,154,462 | 10/1992 | Carpenter . |
| 5,297,334 | 3/1994 | Johnson ................... 296/70 |
| 5,311,960 | 5/1994 | Kukainis et al. ............ 296/70 |
| 5,324,203 | 6/1994 | Sano et al. ................ 296/70 |
| 5,354,114 | 10/1994 | Kelman et al. . |
| 5,358,300 | 10/1994 | Gray . |
| 5,364,159 | 11/1994 | Kelman et al. . |
| 5,370,438 | 12/1994 | Mori et al. . |

(List continued on next page.)

FOREIGN PATENT DOCUMENTS

| | | |
|---|---|---|
| 2383800 | 10/1978 | France . |
| 2541958 | 9/1984 | France . |
| 2623776 | 6/1989 | France . |
| 2729913 | 8/1996 | France . |

OTHER PUBLICATIONS

U.S. Application No. 08/670,133 Merrfield et al., filed Jan. 15,1998.

Primary Examiner—Joseph D. Pape
Assistant Examiner—Kiran Patel
Attorney, Agent, or Firm—Kathryn A. Marra

[57] ABSTRACT

A structural cross car beam for transverse mounting to A-pillars on opposite sides of an automotive vehicle body. The beam comprises outer, intermediate and inner nesting structural members fixed together at upper and lower edge portions and opposite end portions and internally configured to provide a structurally stiff load carrying and support beam. The outer member has a generally U-shaped cross section with upper, rear and lower sides and an open frontal area. The intermediate member has a modified generally W-shaped cross section with upper and lower sides nested with the corresponding sides of the outer member, spaced intermediate sides angled toward one another from adjacent the upper and lower sides to connect with a short front side, and open frontal areas between ends of the short front side and the upper and lower sides of the intermediate member. The inner member has a generally flat cross section closing the open ends of the outer and intermediate members and nesting with the short front side of the intermediate member. The beam provides structural load carrying support between the body A-pillars and for carrying associated components mountable at the forward end of a vehicle passenger compartment. The beam may also define internal passages for distributing air from an associated HVAC unit to the passenger compartment for ventilation and temperature control and to the windshield and side windows for defogging or demisting of their surfaces.

12 Claims, 8 Drawing Sheets

U.S. PATENT DOCUMENTS

| | | |
|---|---|---|
| 5,443,297 | 8/1995 | Tanaka et al. . |
| 5,487,800 | 1/1996 | Ash . |
| 5,549,344 | 8/1996 | Nishijima et al. .................. 296/70 |
| 5,556,153 | 9/1996 | Kelman et al. ..................... 296/70 |
| 5,564,515 | 10/1996 | Schambre ......................... 296/194 |
| 5,673,964 | 10/1997 | Roan et al. ....................... 454/121 |
| 5,676,216 | 10/1997 | Palma et al. ...................... 296/70 |
| 5,678,877 | 10/1997 | Nishijima et al. ................. 296/208 |
| 5,685,595 | 11/1997 | Nishijima et al. ................. 296/70 |
| 5,707,100 | 1/1998 | Suyama et al. .................... 296/70 |
| 5,709,358 | 1/1998 | Kubota ............................ 296/70 |
| 5,709,601 | 1/1998 | Heck ............................... 454/121 |
| 5,762,395 | 6/1998 | Merrifield et al. ................ 296/208 |
| 5,823,602 | 10/1998 | Kelman et al. ................... 296/194 |
| 5,857,726 | 1/1999 | Yokoyama et al. ................ 296/70 |

CROSS CAR STRUCTURAL BEAM

FIELD OF THE INVENTION

This invention relates to cross car structural beams for automotive vehicle bodies.

BACKGROUND OF THE INVENTION

Cross car structural beams are used in the bodies of automotive vehicles to provide structural strength between the A-pillars in the front of the passenger and/or driver compartment. Such beams are commonly used to support an instrument panel assembly and may serve as a reaction surface for occupant protection devices such as air bags or knee bolsters. Some recent steel beams have also been used to support the steering wheel and column assembly and an air handling system such as a heating, ventilating and air conditioning (HVAC) module.

Steel has been the most commonly used material but, when used in so-called "cockpit build" applications where support of the steering column and HVAC system loads is required, results in a very large structure creating weight penalties and packaging problems. Magnesium beam designs have manufacturing and cost penalties. Aluminum beams have packaging problems similar to steel. Plastic beams have so far lacked the stiffness to satisfy noise, vibration and handling (NVH) criteria and are unsuitable for "cockpit build" uses.

SUMMARY OF THE INVENTION

The present invention provides a preferably injection molded plastic cross car (transverse) beam with sufficient structural stiffness to satisfy NVH criteria. The beam carries impact loading from the steering column, knee bolsters and passenger side air bag. It also carries the static loading of the HVAC module and the steering column and wheel assembly and attaches only at the A-pillars, thus making it suitable for "cockpit build" procedures.

In a particular embodiment, the invention resides in:

A structural beam for mounting to A-pillars on opposite sides of an automotive vehicle body, said beam comprising outer, intermediate and inner nesting structural members fixed together at upper and lower edge portions and opposite end portions and internally configured to provide a structurally stiff load carrying and support beam;

said outer member having a generally U-shaped cross section with upper, rear and lower sides and an open frontal area;

said intermediate member having a modified generally W-shaped cross section with upper and lower sides nested with the corresponding sides of said outer member, spaced intermediate sides angled toward one another from adjacent the upper and lower sides to connect with a short front side, and open frontal areas between ends of the short front side and the upper and lower sides of the intermediate member; and said inner member having a generally flat cross section closing the open ends of said outer and intermediate members and nesting with said short front side of the intermediate member;

said beam providing structural load carrying support between the body A-pillars and for carrying associated components mountable at the forward end of a vehicle passenger compartment.

The design of the beam may provide internal passages for conducting air from the HVAC system to the passenger compartment for ventilation and temperature control and against the windshield and side windows for defogging and demisting. The three piece design provides better load distribution through triple wall thicknesses, reduces parts and packaging space, and improves dimensional stability through combining air conditioning, windshield and side window defog and demist passages. The design is adaptable to any suitable plastic material.

These and other features and advantages of the invention will be more fully understood from the following description of certain exemplary embodiments of the invention taken together with the accompanying drawings.

DETAILED DESCRIPTION OF THE INVENTION

Figure 1:
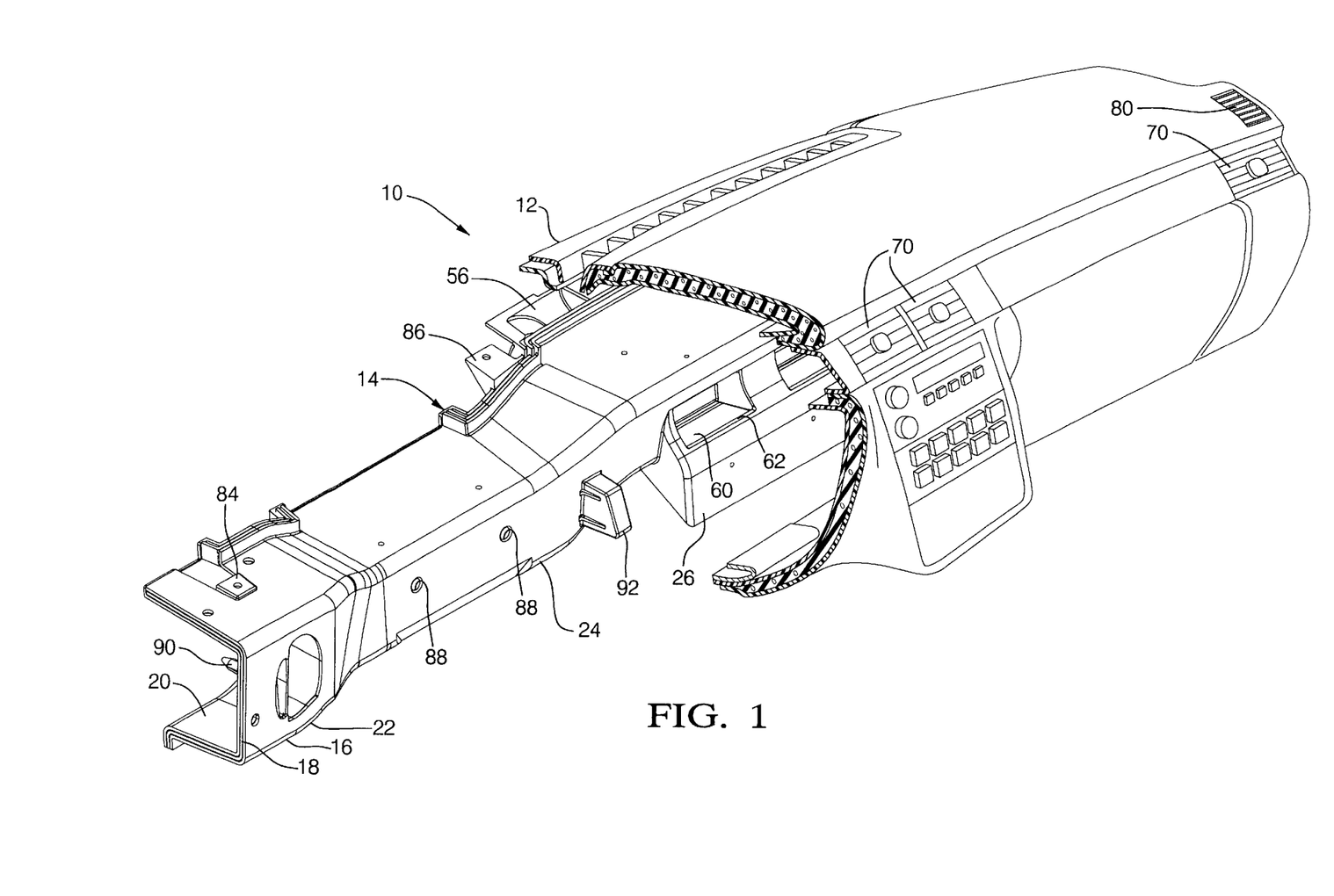
FIG. 1 is a pictorial view of an automotive dash-instrument panel partially broken away to show a nested three piece structural beam according to the invention.

Referring now to FIG. 1 of the drawings, numeral 10 generally indicates an interior portion of a vehicle body having a having a dash or instrument panel 12 extending between side walls, not shown, of the body. The instrument panel is broken away to show a composite structural beam 14 formed according to the invention. The beam 14 partially supports the instrument panel 12 as well as a heating, ventilating and air conditioning (HVAC) unit, steering column and wheel, knee bolsters and passenger air bag, none of which are shown. Other items could be carried on the beam if desired in place of or in addition to those listed. Beam 14 must have sufficient strength and stiffness to support static and dynamic loads created by the supported items as well as to absorb impact loading which may be transferred from the steering column, knee bolsters and the passenger air bag. It must also control vibration of the mounted and associated items to meet criteria limiting noise, vibration and harshness (NVH) to acceptable levels for passenger satisfaction.

FIGS. 2–19 of the drawings illustrate the construction of the structural beam 14 in detail. The beam 14 is an assembly, shown in FIG. 5 and including an outer member 16, an intermediate member 18 and an inner member 20 nested together. For purposes of description, directional references, such as front, rear, upper, lower, lateral, longitudinal, etc. are relative to the vehicle body 10 in which the beam 14, when installed, extends laterally across the front of the passenger compartment. The beam 14 and its members 16, 18, 20 may be divided laterally along its length into aligned end, intermediate and central sections 22, 24, 26, respectively. Each of the members 16, 18, 20 is made of plastic material, preferably formed by injection molding, although other suitable means of manufacture could be used if desired. Injection molding is preferred at present because of its high degree of dimensional accuracy in the formation of plastic members with constant or controlled thickness walls. The plastic material to be used may be determined by the specifications required to obtain the desired beam characteristics. Vibration welding is a preferred method of fixing the members 16, 18, 20 together, however other suitable means of assembly may be used if desired.

Figure 2:
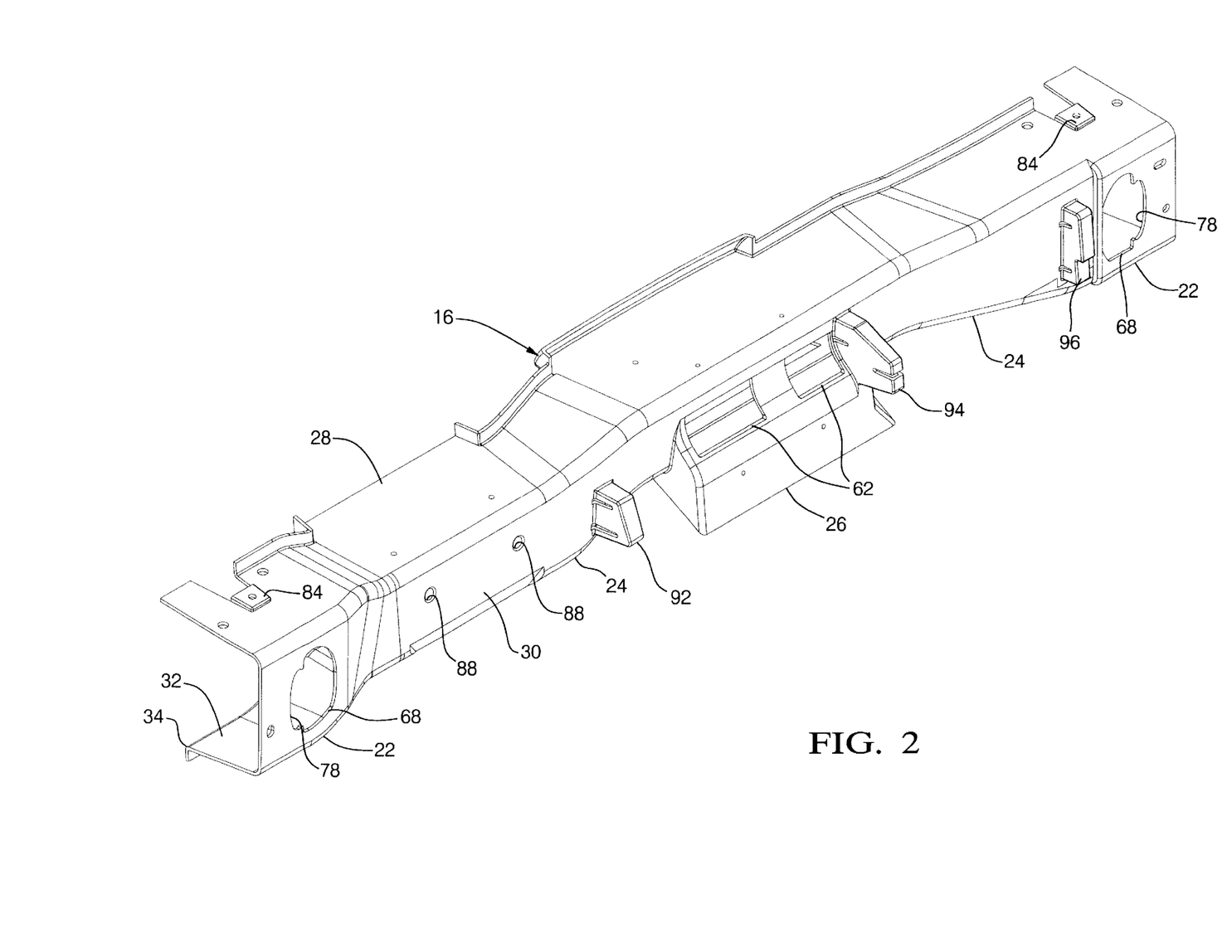
FIG. 2 is a pictorial view of an outer member of the beam of FIG. 1.

The outer member 16, shown separately in FIG. 2, has its end 22 and intermediate 24 sections formed with a generally U-shaped cross section having upper, rear and lower sides 28, 30, 32 and an open frontal area 34. The sizes of the cross sections vary to accommodate available space and the items to be mounted on the beam 14.

Figure 3:
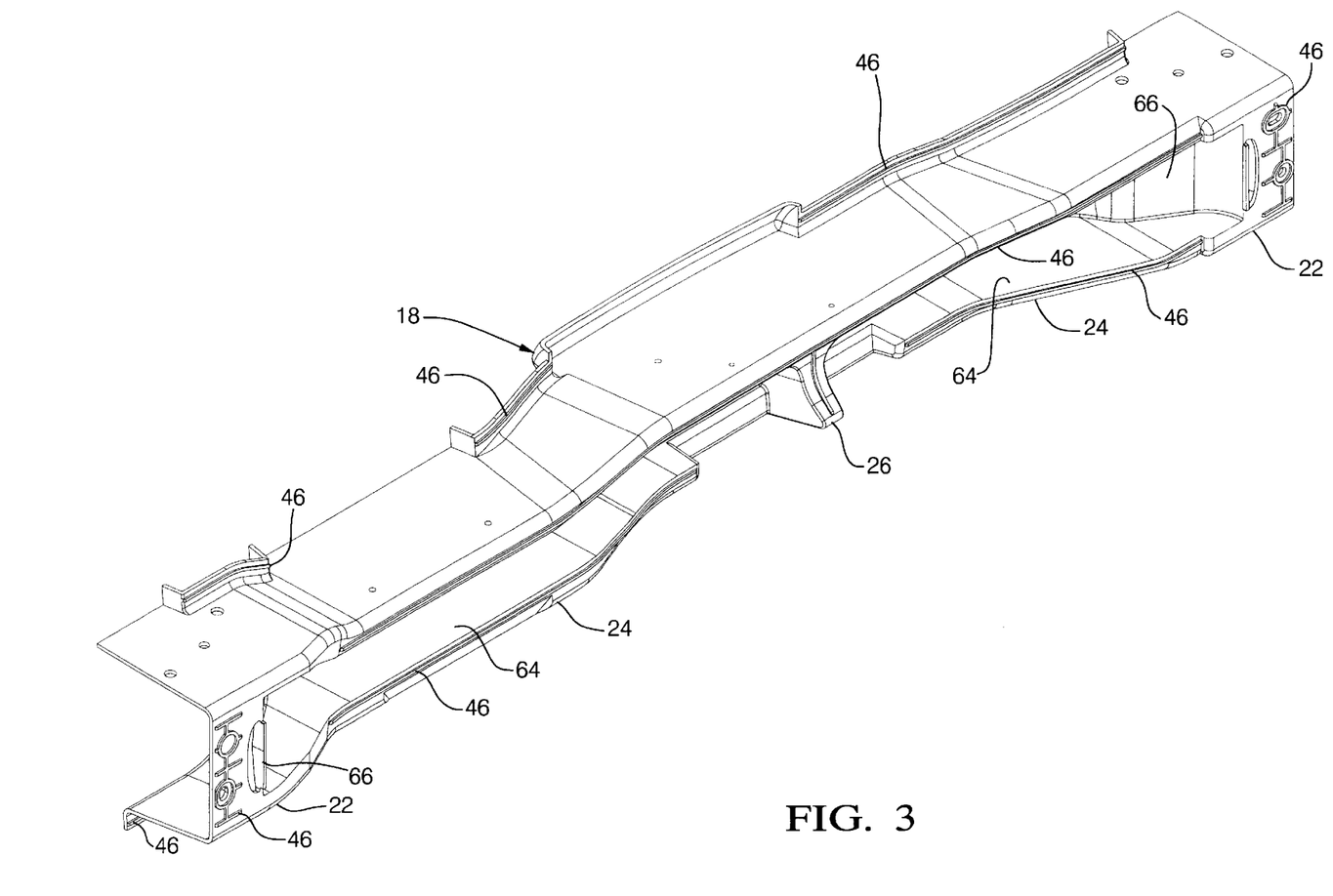
FIG. 3 is a pictorial view of an intermediate member of the beam of FIG. 1.

The intermediate member 18 has outer ends of its end sections 22 formed with a U-shaped cross section nesting in assembly within the end sections 22 of the outer member 16. The intermediate sections 24 of the intermediate member 18 are formed with generally W-shaped cross sections as seen in FIGS. 9–12, 15 and 16. These W-shaped cross sections have upper and lower sides 36, 38, and spaced intermediate sides 40, 42, connecting with rear edges of the upper and lower sides 36, 38, respectively, and angled forwardly toward one another to connect with a relatively short front side 44. Portions of the end sections 22 merge the W-shaped cross sections into U-shaped cross sections as will be subsequently further described. In FIG. 3, slightly raised vibration weld flanges 46 may be seen at contact points of the intermediate member 18 with the outer member 16.

The inner member 20 also has outer ends of its end sections 22 formed with generally U-shaped cross sections for nesting with the intermediate and outer members. The intermediate sections 24 and outer parts of the central section 26 are of generally flat cross section for closing, in assembly, the open frontal area 34 of the outer and intermediate members. Vibration weld flanges 46 are also provided as shown in FIG. 4 at contact points of the inner member 20 with the intermediate member 18.

Figure 4:
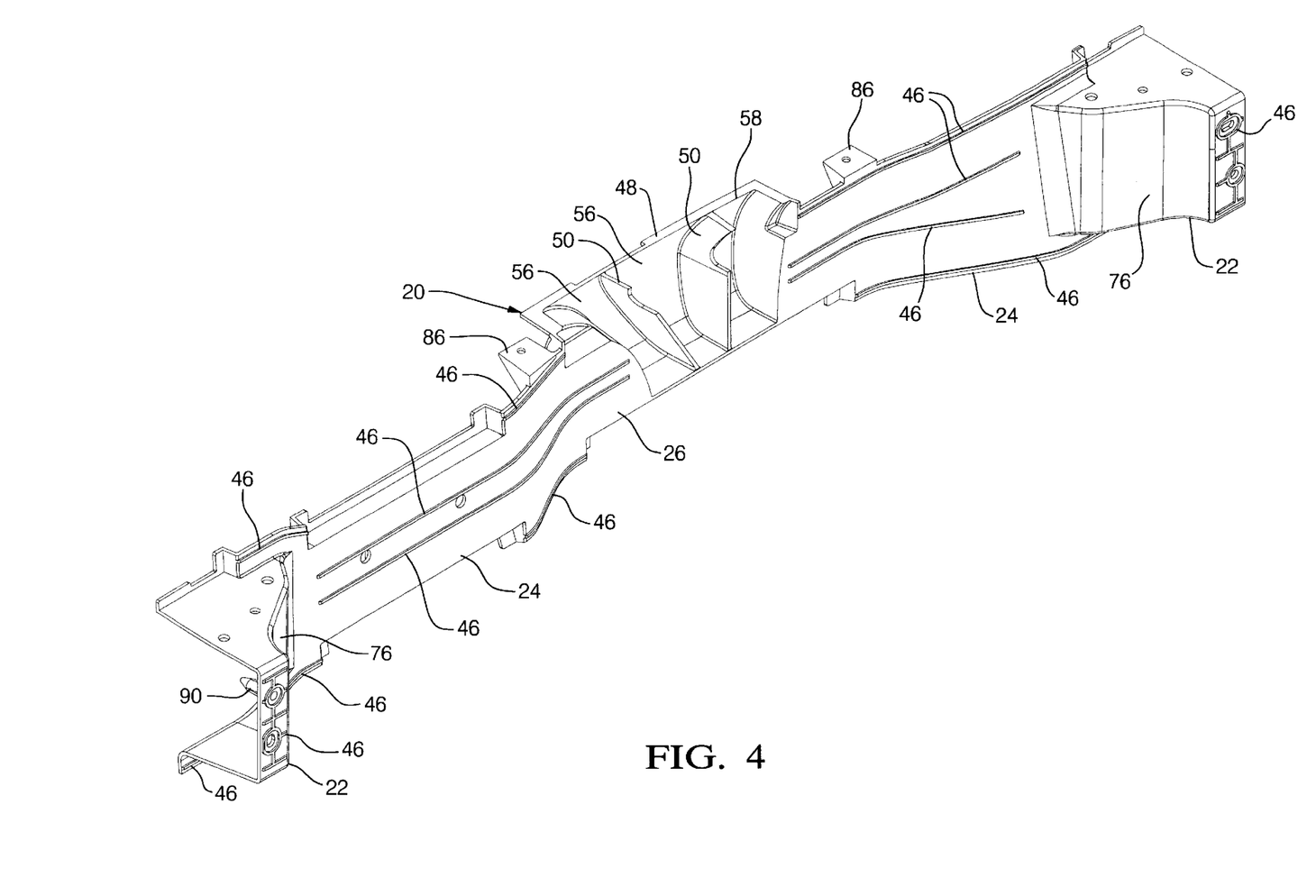
FIG. 4 is a pictorial view of an inner member of the beam of FIG. 1.

With continued reference to FIG. 4, the inner member 20 has a forward extending portion 48 located in the middle of the central section 26. Portion 48 forms an upwardly open outwardly flared pocket having therein guide vanes 50 which act as deflectors for windshield defogging air distribution.

In assembly, as shown in FIGS. 5–19, the members 16, 18, 20 are nested and retained together by a vibration welding process which, under vibration and pressure, melts the weld flanges 46 and adjacent wall portions. This forms the beam 14 as a fixed assembly of plastic members sealed along the edges and internal joints by the melted weld flanges 46. Within the assembly or beam 14 are defined a plurality of air distribution passages for conducting air from the HVAC unit (not shown) to various locations within the vehicle.

Figure 14:
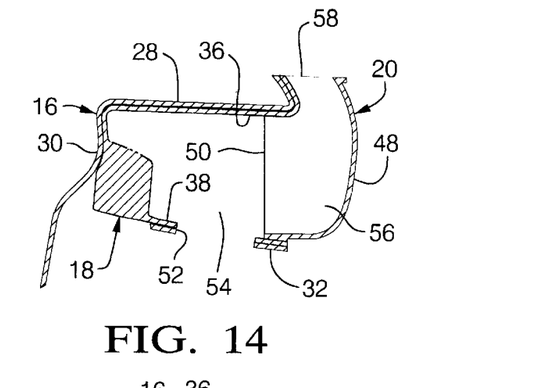
Figures 15, 16, 17, 18, 19:
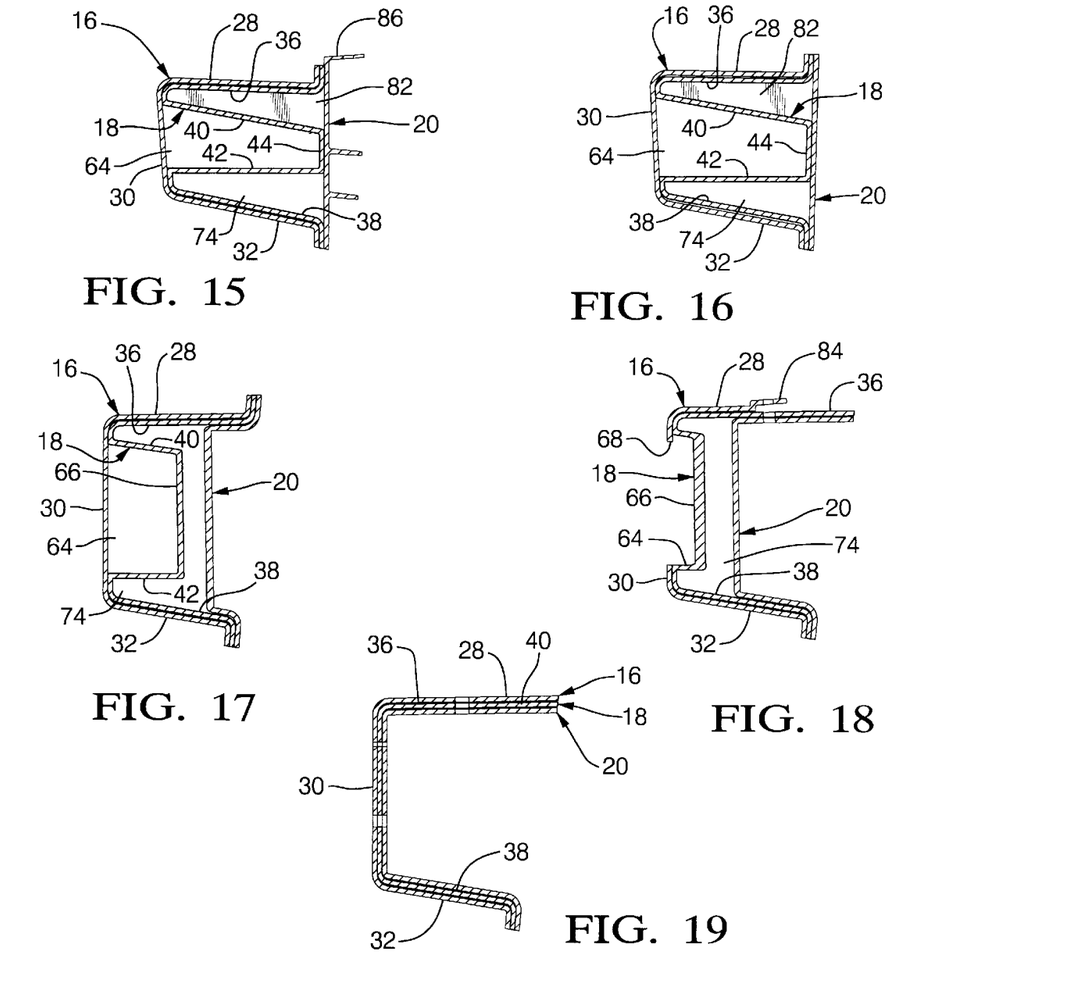

FIG. 14 shows a first inlet opening 52 through which the HVAC unit, not shown, delivers air to a central plenum 54 within intermediate member 18. From the plenum 54, the air is distributed through passages 56 adjacent the ribs 50 in the forward extending portion 48 (FIG. 5) of the inner member 20 to an upper outlet 58 for defogging the vehicle windshield, not shown.

Figure 5:
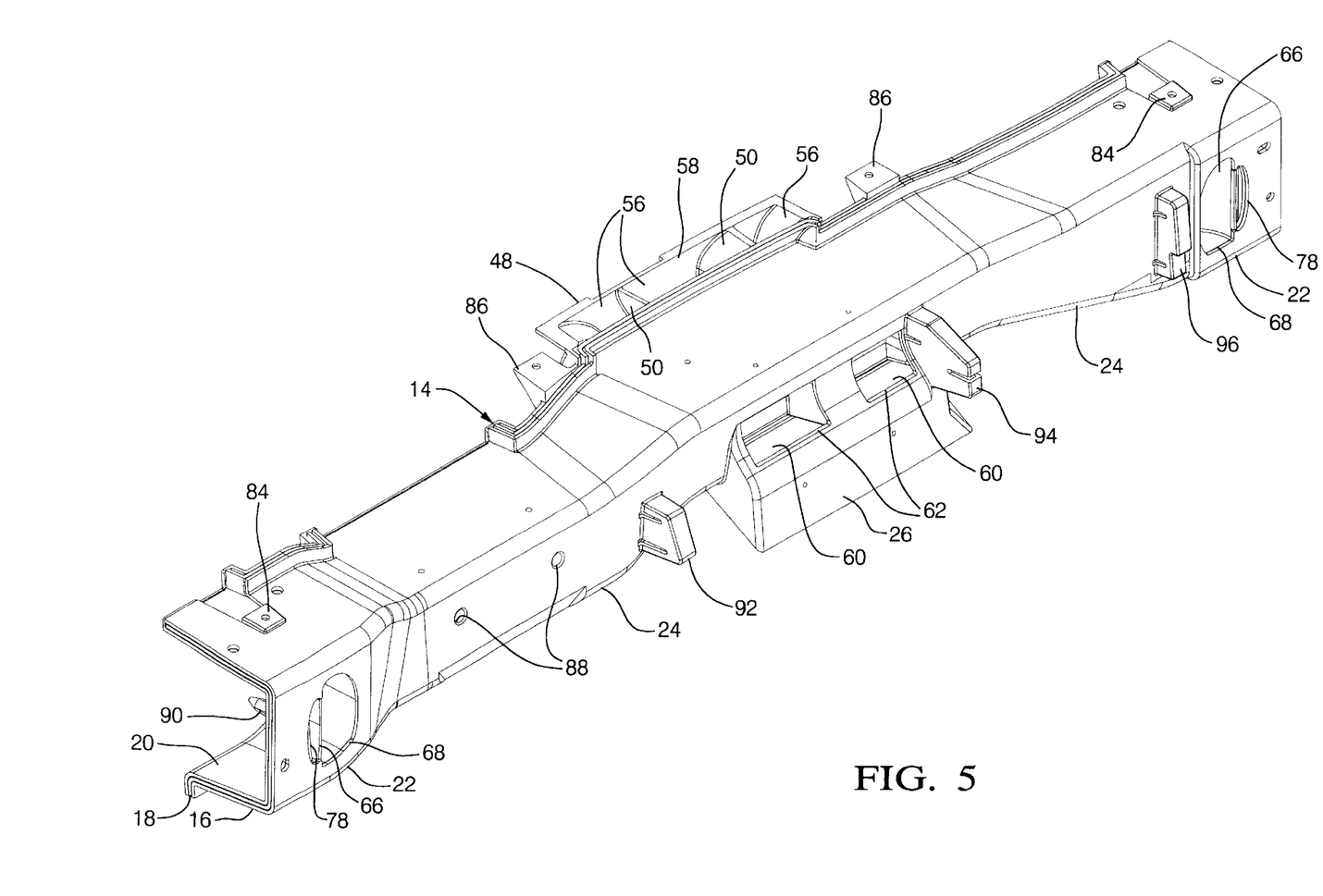
FIG. 5 is a pictorial view of the assembled beam of FIG. 1.
Figure 6:
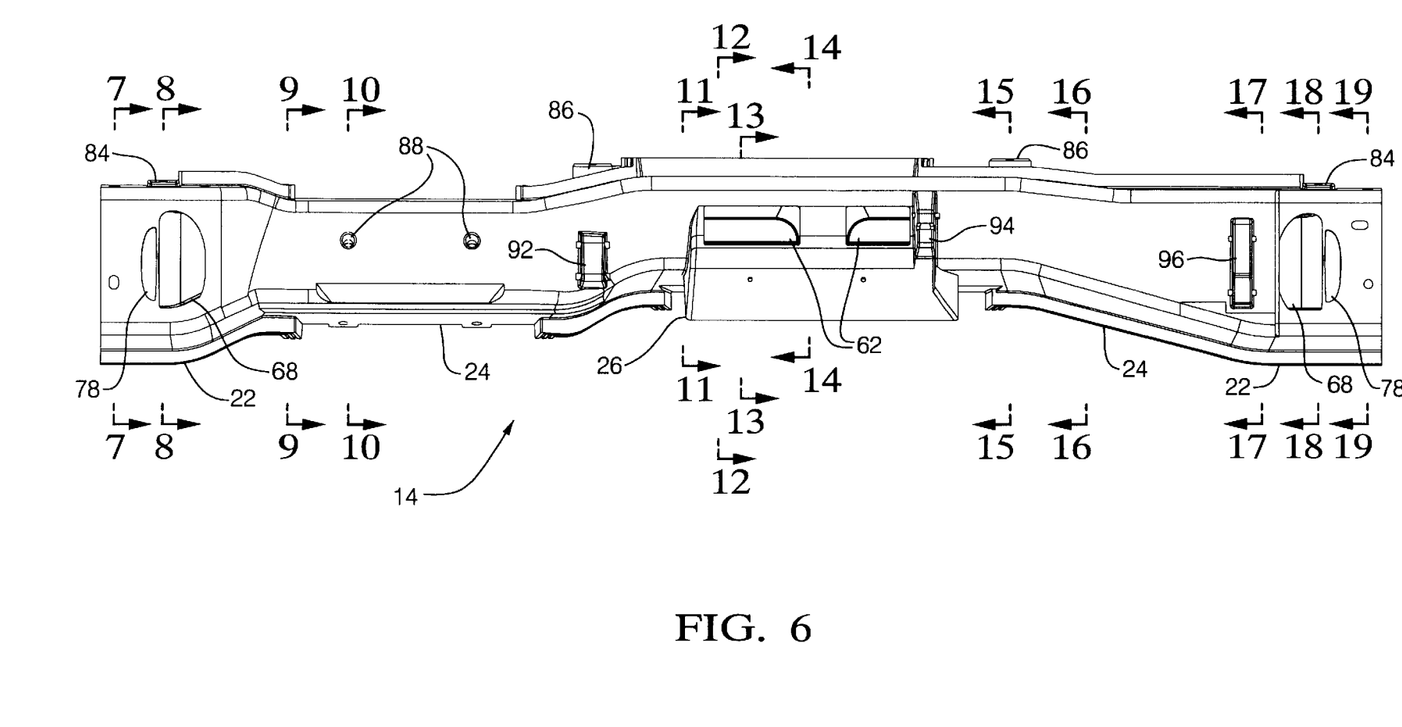
FIG. 6 is a rear elevational view of the assembled beam of FIG. 1.
Figure 7:
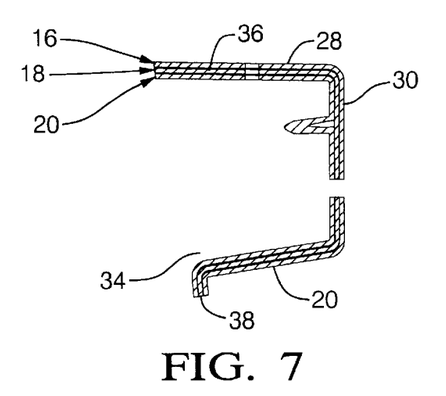
FIGS. 7–19 are, respectively, cross-sectional views from the lines 7—7 to 19—19 of FIG. 6, looking in the direction of the arrows.
Figure 8:
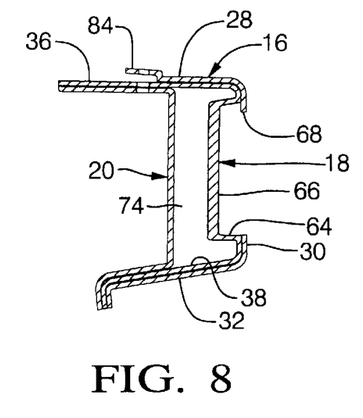
Figure 9:
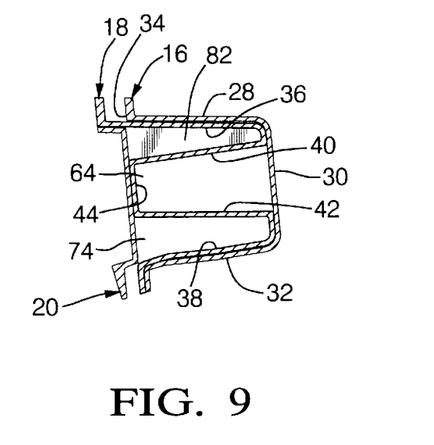
Figure 10:
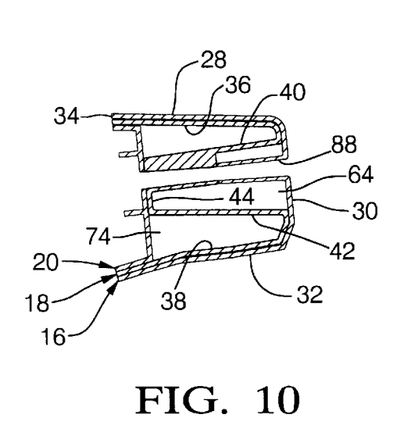
Figure 11:
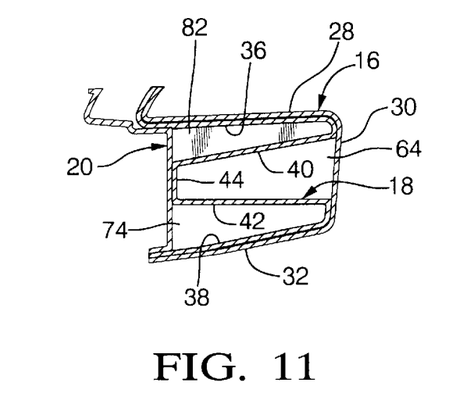
Figure 12:
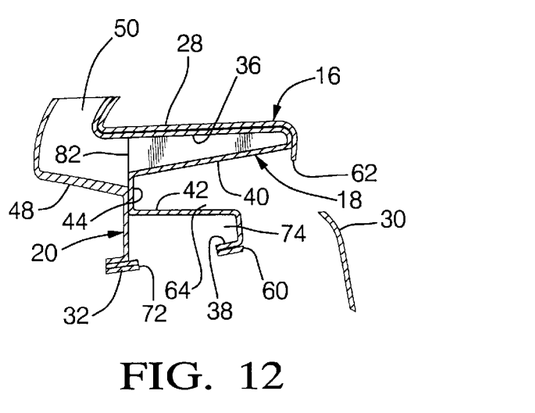
Figure 13:
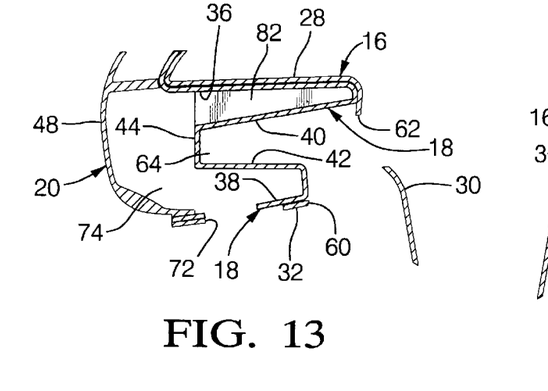

FIG. 13 shows one of two laterally spaced second inlet openings 60 spaced behind opening 52. The openings 60 direct air from the HVAC unit, not shown, out through rear openings 62 in the outer member 16 and into lateral passages 64 running from the central section 26 to the end sections 22 of the beam 14 between the intermediate sides 40, 42 of the intermediate member 18. As shown in FIGS. 3 and 5, passages 64 are directed by rearward angled portions 66 of the front wall 44 to large inner openings 68 in the rear side 30 of the outer member 16. Openings 62 and 68 direct air through connecting ducts, not shown, to outlets 70 in the dashinstrument panel 12 for delivery to the passenger compartment.

FIG. 13 also shows one of two laterally spaced third inlet openings 72 adjacent opening 52. The openings 72 direct air from the HVAC unit, not shown, into lateral passages 74 running from the central section 26 to the end sections 22 of the beam 14. The passages extend generally between the lower side 38 and the adjacent intermediate side 42 of the intermediate member 18 and, as shown in FIGS. 4 and 5, are directed by rearward angled portions 76 of the inner member 20 to small outer openings 78 in the rear sides 30 of the outer and intermediate members 16, 18. Openings 78 direct air through connecting ducts, not shown, to outlets 80 in the dash-instrument panel 12 for delivery of demist air against the side windows, not shown, of the vehicle. The upper portion of the beam interior, between the upper side 36 and intermediate side 40 of the intermediate member is blocked from lateral air flow by a plurality of longitudinal stiffening ribs 82 which strengthen the beam internally.

Beam 14 is also provided with various mounting means which may be varied as needed. FIG. 5 shows, for example, instrument panel mounting pads 84, 86, steering column mounting openings 88, beam installation guide pin 90 and air bag and HVAC supports 92, 94, 96. Various other mounting and locating openings are also shown. These mounting means as well as other construction details of the beam may be varied as needed without departing from the features of the invention disclosed.

While the invention has been described by reference to an exemplary embodiment, it should be understood that numerous changes may be made within the spirit and scope of the inventive concepts described. Accordingly, it is intended that the invention not be limited to the described embodiment, but that it have the full scope defined by the language of the following claims.

We claim:

1. A structural beam for mounting to A-pillars on opposite sides of an automotive vehicle body, said beam comprising:

outer, intermediate and inner nesting structural members fixed together at upper and lower edge portions and opposite end portions and internally configured to provide a structurally stiff load carrying and support beam;

said outer member having a generally U-shaped cross section with upper, rear and lower sides and an open frontal area;

said intermediate member having a modified generally W-shaped cross section with upper and lower sides nested with the corresponding sides of said outer member, spaced intermediate sides angled toward one another from adjacent the upper and lower sides to connect with a short front side, and open frontal areas between ends of the short front side and the upper and lower sides of the intermediate member; and said inner member having a generally flat cross section closing the open ends of said outer and intermediate members and nesting with said short front side of the intermediate member;

said beam providing structural load carrying support between the body A-pillars and for carrying associated components mountable at the forward end of a vehicle passenger compartment.

2. A structural beam as in claim 1 wherein said members are made of plastic.

3. A structural beam as in claim 1 wherein said sides of the members are of generally constant thickness.

4. A structural beam as in claim 1 wherein said outer member includes mounting means for supporting a steering gear assembly on the beam.

5. A structural beam as in claim 1 wherein said members define internal air distribution passages within the beam, said beam including air inlet opening means through the lower side of at least one of said outer and intermediate members for connecting an air delivery system with said internal passages.

6. A structural beam as in claim 5 wherein said air passages include windshield defogging passages and passenger compartment air passages.

7. A structural beam as in claim 6 wherein said inner and intermediate members define air flow openings at upper edges of said members and connecting with said windshield defogging passages.

8. A structural beam as in claim 6 wherein said outer member includes air flow openings in its rear side and connecting with said passenger compartment air passages.

9. A structural beam as in claim 6 wherein said passages further include side window demist passages.

10. A structural beam as in claim 9 wherein said outer member includes demist outlet openings positioned for clearing side windows of the vehicle, said demist openings connecting with said side window demist passages.

11. A structural beam as in claim 9 wherein said defogging passages extend upwardly between the intermediate and inner members from a first lower inlet opening to upper outlet openings, said passenger compartment air passages extend laterally from second lower inlet openings to first rear outlet openings, and said demist passages extend laterally from third lower inlet openings to second rear outlet openings.

12. A structural beam as in claim 1 wherein said intermediate member includes a plurality of vertical stiffening ribs between its upper side and the adjacent intermediate side.

* * * * *